United States Patent [19]

Jaquith et al.

[11] Patent Number: 4,884,322
[45] Date of Patent: * Dec. 5, 1989

[54] COUPLING DEVICE

[76] Inventors: Hope Jaquith, P.O. Box 6804, Laguna Niguel, Calif. 92677; Kent Jaquith, Rte. 1, Box 1401, Zillah, Wash. 98953; William Jaquith, P.O. Box 6804, Laguna Niguel, Calif. 92677

[ * ] Notice: The portion of the term of this patent subsequent to Jan. 11, 2000 has been disclaimed.

[21] Appl. No.: 363,612

[22] Filed: Mar. 30, 1982

[51] Int. Cl.⁴ .............................................. A44B 13/02
[52] U.S. Cl. .................................... 24/241 PS; 24/239
[58] Field of Search ................ 24/232 R, 129 R, 233, 24/248 E, 225, 249 R, 252 R, 254, 234, 201 HE, 327, 334, 241 PS, 239; 224/252, 255, 268, 269, 910

[56] References Cited

U.S. PATENT DOCUMENTS

| 741,014 | 10/1903 | Covert | 24/239 |
|---|---|---|---|
| 1,684,322 | 9/1928 | Itjen | 24/239 |
| 2,615,324 | 10/1952 | Meeker | 24/232 |
| 3,057,526 | 10/1962 | Jaquith | 24/232 |
| 3,952,382 | 4/1976 | Vaage | 24/234 |
| 4,367,830 | 1/1983 | Jaquith et al. | 24/230 AT |

Primary Examiner—Mickey Yu
Attorney, Agent, or Firm—Blakely, Sokoloff, Taylor & Zafman

[57] ABSTRACT

A coupling device for engaging members having rings, hooks, bars and the like is disclosed. The coupling device is constructed in a manner which reduces the number of moving parts needed to engage and disengage members having rings, hooks or bars over the prior art, thereby simplifying the manufacturing process. In particular, means are provided for disengaging the rings, hooks or bars from the coupling device which means comprises only a spring, two retractable jaws and a plunger having an end of predetermined extent which the ring, hook or bar on the member may bear against, thereby compressing the spring and retracting the jaws.

2 Claims, 1 Drawing Sheet

COUPLING DEVICE

This is a continuation-in-part application of Application Ser. No. 283,165 filed July 14, 1981 for Musical Instrument Support, now U.S. Pat. No. 4,367,830 to be issued Jan. 11, 1983.

PRIOR ART

U.S. Pat. No. 3,057,526 which issued Oct. 9, 1962, discloses a musical instrument support comprising a wide neck band portion, a cord, a slide member and a clasp member. This prior art clasp member is related to the coupling device disclosed herein. However, in addition to the structural differences between this prior art clasp or coupling device and the coupling device disclosed herein, the coupling device disclosed herein may be used in fields other than the musical instrument support field.

The clasp member disclosed in U.S. Pat. No. 3,057,526 is disposed at an end of the support opposite the wide neck band portion. The clasp is comprised of a body portion, a spring, two jaws, a plunger and two brake members. The spring urges the jaws in what may be referred to as a closed position. In the closed position, the jaws extend into a cutout at an end of the body portion. When pressure is exerted against the jaws sufficient to overcome the force exerted by the spring, the jaws open and retract into the body portion. When a support ring of a musical instrument is pushed against the jaws they open and once the ring passes the jaws, they snap closed by the urging of the spring, thereby capturing the support ring. When it is necessary to remove the instrument from the clasp, the support ring is pushed against the plunger which exerts a force on the spring thereby opening the jaws. At this time, digitally operated brake members on the sides of the body portion are pressed inwardly. The brake members hold the plunger in a position which keeps the jaws in their open position. The instrument support ring may then be pulled out of the cutout. When the brake members are released, the jaws move back to their closed position.

SUMMARY OF THE INVENTION

A coupling device for engaging members having rings, hooks, bars and the like is disclosed. The coupling device is constructed in a manner which reduces the number of moving parts needed to engage and disengage members having rings, hooks or bars over the prior art, thereby simplifying the manufacturing process. In particular, means are provided for disengaging the rings, hooks or bars from the coupling device which means comprises only a spring, two retractable jaws and a plunger having an end of predetermined extent which the ring, hook or bar on the member may bear against, thereby compressing the spring and retracting the jaws.

DETAILED DESCRIPTION OF THE INVENTION

A coupling device 21 for engaging and disengaging members having rings or eyelets, hooks, bars or the like is disclosed.

Figure 1:
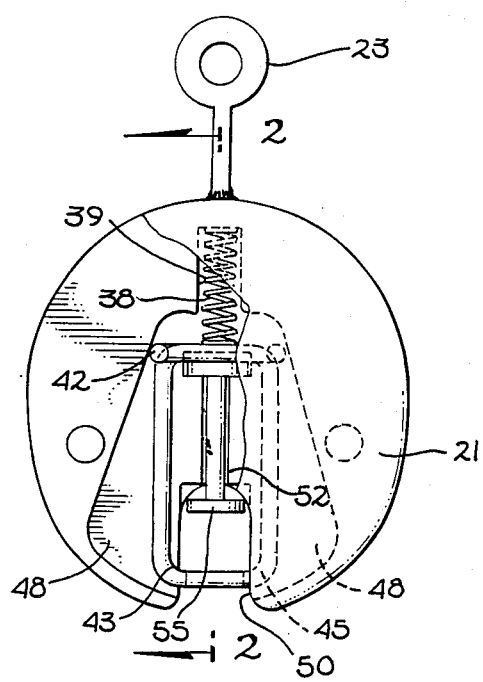
FIG. 1 is a sectional view of the coupling device.
Figure 2:
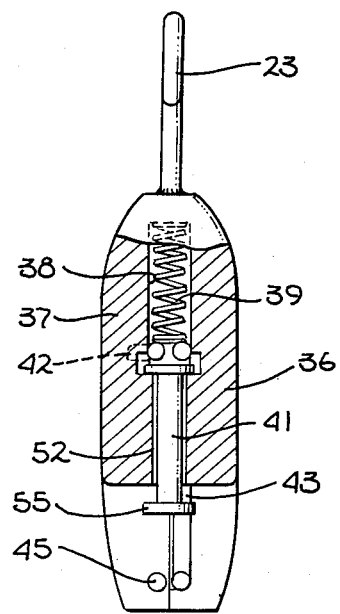
FIG. 2 is a sectional view taken along line 2—2 of FIG. 1.

Referring to FIGS. 1 and 2, the details of the coupling device 21 may best be described. The coupling device 21 comprises two, preferably round, symmetrical body portions 36 and 37, a spring cavity 38 in each body portion, spring 39, plunger 41, jaws 43 and 45, and a jaw cavity 48 in each body portion. The body portions 36 and 37 being symmetrical, may be produced from the same mold. A ring 23 or other such member is coupled to or integral with the coupling device. The ring 23 is used to couple the subject coupling device to other devices. Alternatively, the ring 23 may also be formed within the body portions 36 and 37 instead of being external thereto as shown in the drawings. The coupling device may also be part of and integral with a larger member thereby eliminating the need for ring 23 or other means to secure the coupling device to another device.

Spring recess 38 is radially disposed within body portions 36 and 37, one end of said recess adjacent the ends of the body portions and the other end thereof adjacent the centers of the body portions. One end of body portions 36 and 37 opposite from the ends thereof where spring recess 38 is disposed have an approximately U-shaped cutout 50. A groove 52 extends between U-shaped cutout 50 and spring recess 38. Groove 52 and spring recess 38 have a common longitudinal axis. A cylindrical plunger 41 having enlarged flattened surfaces at its ends fits in cooperatively sized groove 52. The enlarged flattened ends of the plunger 41 extend slightly into spring recess 38 and cutout 50 respectively.

The two jaws 43 and 45 are each formed from stiff wire, each jaw having three 90° bends. Alternatively, where a heavy duty version of the subject coupling device is needed, the jaws may be formed of metallic bars bended or welded together to form the three 90° bends. A first bend adjacent one end of the wire and a second bend intermediate the ends of the wire lie in one plane. A third bend adjacent the other end of the wire lies in a second place perpendicular to the first plane. An aperture 42 in each of the body portions 36 and 37 is disposed slightly offset from the common longitudinal axis of groove 52 and spring recess 38. Each aperture 42 is sized to receive the end of one of the jaws 43 or 45 adjacent the third bend such that each aperture will act as a pivot point for its respective jaw. A portion of each wire, between the third bend and second bend, lie adjacent the enlarged flattened end of plunger 41 which extends into spring recess 38. After the second bend, each wire is directed towards cutout 50. After the first bend, each wire extends into cutout 50 from opposite sides thereof. Jaws 43 and 45 are normally disposed in what will be referred to as the closed position caused by the urging of a spring 39. Spring 39 is disposed within spring recess 38 and bears on those portions of jaws 43 and 45 which lie adjacent the enlarged flattened end of plunger 41 which extends into spring recess 38. When a force is applied to jaws 43 and 45 such that the urging of spring 39 is overcome, the jaws pivot around apertures 42, and the portions of the jaws which extend into cutout 50 then retract into body portions 36 and 37. A recess 48 in each body portion is adapted to receive a respective jaw in its above-described retracted position.

Members which may be engaged by the subject coupling device incorporate an eyelet or support ring, hook, bar or similar member which fits in cutout 50. Hereinafter, it will be understood that references to an eyelet include a support ring, hook, bar or similar member. In the normal engaged position, the eyelet rests against the portions of the jaws which extend into the cutout 50. When it is desired to remove the eyelet from the coupling device, the eyelet is pressed against the plunger 41 at its end adjacent the spring 39. This pressure urges the jaws 43 and 45 to enter recess 48. By maintaining pressure on the plunger 41 with the eyelet and rolling the eyelet out of the cutout 50, the coupling device is disengaged from the eyelet. To engage the eyelet, it is merely necessary to press the eyelet against the portion of the jaws 43 and 45 extending into the cutout 50. This pressure will overcome the force of the spring 39 urging the jaws in the closed position. The jaws will snap open thereby allowing the eyelet to enter the cutout 50. After the eyelet passes the jaws, the urging of the spring 38 will cause the jaws to immediately snap close, thereby capturing the eyelet.

It will be appreciated that the end 55 of plunger 41 which extends into cutout 50 must be large enough to enable the eyelet to maintain a force against the plunger while the eyelet is being removed from cutout 50. Thus, the end 55 must be of sufficient extent, i.e. diameter or width in a direction perpendicular to the direction of the portion of the jaws 43 and 45 which extend into the cutout 50, to enable the eyelet to remain in contact with the end of the plunger 41 until the eyelet is removed from cutout 50.

The width or diameter of the end 55 of the plunger 41 is dependent upon the inside and outside diameter of the eyelet. Generally, the larger the outside diameter of the eyelet, the larger the width or diameter of end 55 must be. However, if the inside diameter of the eyelet is sufficiently small, then the eyelet, itself, once it engages the opened jaws, will keep the jaws 43 and 45 open until the eyelet has been removed from the cutout 50.

The coupling device may be used where the need arises for a means for removably coupling two members together wherein one of the members has a ring or eyelet which may be engaged by jaws on the second member which jaws may be opened or closed by action of the ring. The device may be made of plastic, metal or other materials. The strength of the materials will of course depend on the end use contemplated for the device. When used in connection with towing heavy equipment or otherwise lifting heavy weights, the materials utilized should be capable of supporting such heavy weights. Additionally, to prevent inadvertent disengaging of the eyelet from the jaws of the coupling device, means may be provided to selectively and substantially prevent movement of the plunger 41 when force is maintained against end 55. For example, a member may be inserted between the end 55 of plunger 41 and that portion of the shaft of plunger 41 which extends into cutout 50. The member may, for example, be U-shaped and have resilient legs adapted to fit on and engage that portion of the shaft extending into the cutout.

Thus, a coupling device has been disclosed for attaching one object to a second object wherein the first object is supported, towed or lifted by the second object. Both coupling and decoupling are easily accompanied and the device has a minimum of moving parts.

We claim:

1. A coupling device comprising a body portion having a cutout with a predetermined width defined on one end thereof, two retractable jaws, each of said jaws normally extending into said cutout from opposite sides thereof, a spring disposed within said body portion adapted to urge said jaws to extend into said cutout, a plunger disposed within said body portion adapted to compress said spring and urge said jaws to a retracted position when a predetermined pressure is applied to said plunger in a direction opposite said cutout, said plunger having an end which extends into said cutout, which end has a predetermined extent, said extent being of substantially the same width as the width of said cutout, thereby having a sufficient dimension to enable a member with a ring, eyelet, hook or bar disposed within said cutout to maintain said predetermined pressure against said end to maintain said jaws in said retracted position until said member can be disengaged from said coupling device;

whereby said member with a ring, eyelet, hook or bar may be removably coupled to said coupling device by the action of said jaws, said predetermined pressure applied by said member to said plunger at said end of predetermined extent which extends into said cutout, and said spring.

2. The coupling device defined by claim 1 further comprising means for selectively and substantially preventing movement of said plunger when pressure is applied to said end.

* * * * *